United States Patent
Reid et al.

(10) Patent No.: US 11,210,128 B2
(45) Date of Patent: Dec. 28, 2021

(54) DEVICE VIRTUALIZATION SECURITY LAYER

(71) Applicant: AT&T Intellectual Property I, L.P., Atlanta, GA (US)

(72) Inventors: Dylan Reid, Atlanta, GA (US); Joseph Soryal, Ridgewood, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 204 days.

(21) Appl. No.: 16/584,413

(22) Filed: Sep. 26, 2019

(65) Prior Publication Data

US 2021/0096895 A1    Apr. 1, 2021

(51) Int. Cl.

| | | |
|---|---|---|
| G06F 9/455 | (2018.01) | |
| G06F 9/445 | (2018.01) | |
| H04L 29/06 | (2006.01) | |
| G06F 21/60 | (2013.01) | |
| G06F 40/242 | (2020.01) | |
| G06F 40/289 | (2020.01) | |

(52) U.S. Cl.
CPC ...... *G06F 9/45558* (2013.01); *G06F 9/44505* (2013.01); *G06F 21/602* (2013.01); *G06F 40/242* (2020.01); *G06F 40/289* (2020.01); *H04L 63/18* (2013.01); *G06F 2009/45562* (2013.01); *G06F 2009/45583* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 2014/0032920 A1* | 1/2014 | Gehrmann | ............ | H04L 9/0822 713/176 |
| 2015/0134965 A1* | 5/2015 | Morenius | ................ | G06F 21/57 713/172 |

OTHER PUBLICATIONS

Zhao, Xin, Kevin Borders and A. Prakash. "Virtual Machine Security Systems." (2006). 27 pages. Book Chapter published in "Advances in Computer Science and Engineering". https://www.semanticscholar.org/paper/Virtual-Machine-Security-Systems-Zhao-Borders/921eef7b27f4f7a1679587d1dfbe9f99769ecf77.

* cited by examiner

*Primary Examiner* — Charlie Sun

(57) ABSTRACT

A processing system of a device having at least one processor may obtain a set of codes from a virtual machine orchestrator via a virtualization security controller of the processing system, obtain a first virtual machine configuration file from the virtual machine orchestrator via a hypervisor of the processing system, and pass at least one code of the set of codes from the virtualization security controller to the hypervisor. The processing system may then apply, via the hypervisor, a decryption to the first virtual machine configuration file using the at least one code, determine that a threshold percentage of content of the first virtual machine configuration file comprises dictionary-recognizable words in accordance with the decryption, and instantiate, via the hypervisor, a first virtual machine in accordance with the first virtual machine configuration file when it is determined that the threshold percentage of the content comprises dictionary-recognizable words.

20 Claims, 4 Drawing Sheets

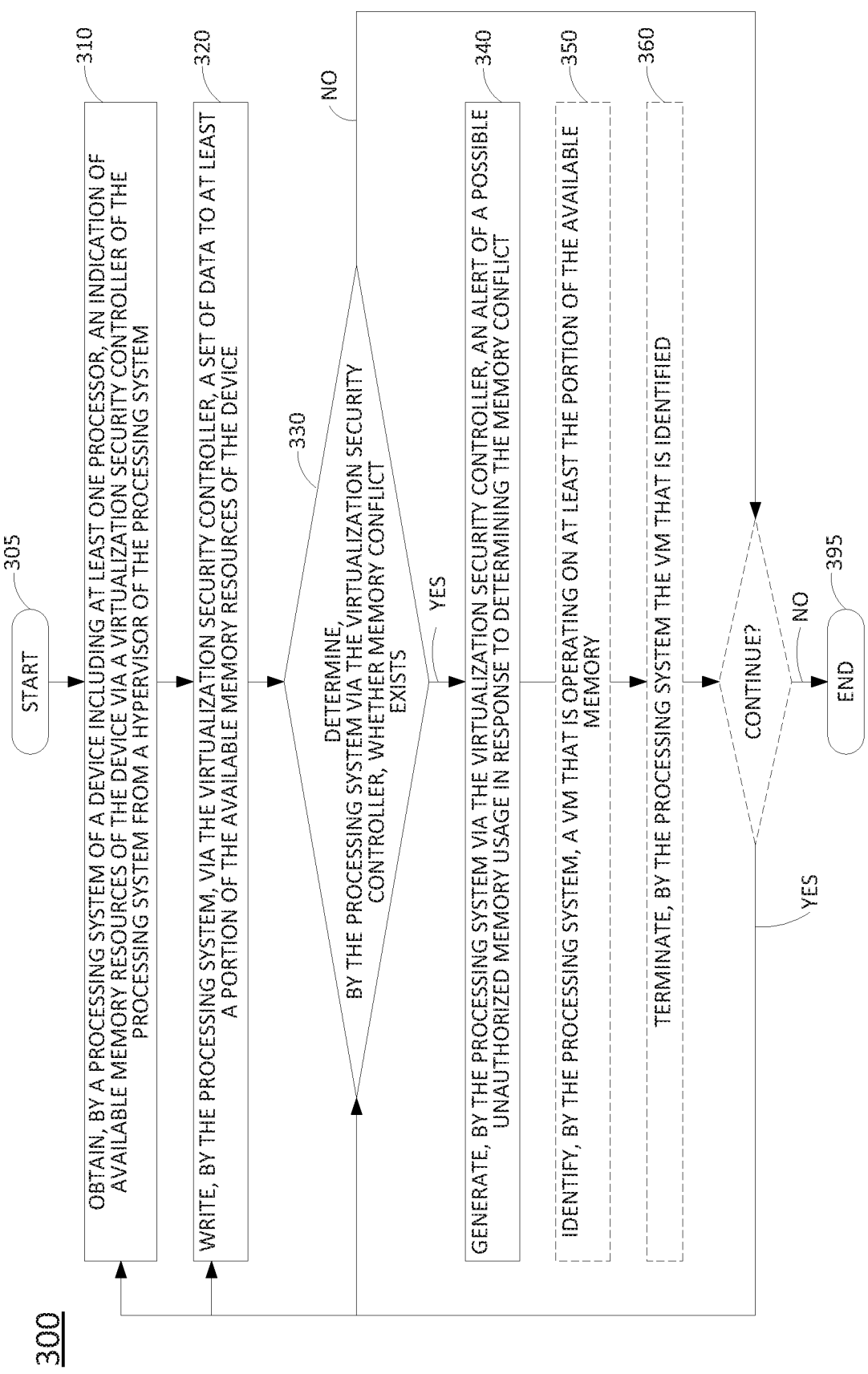

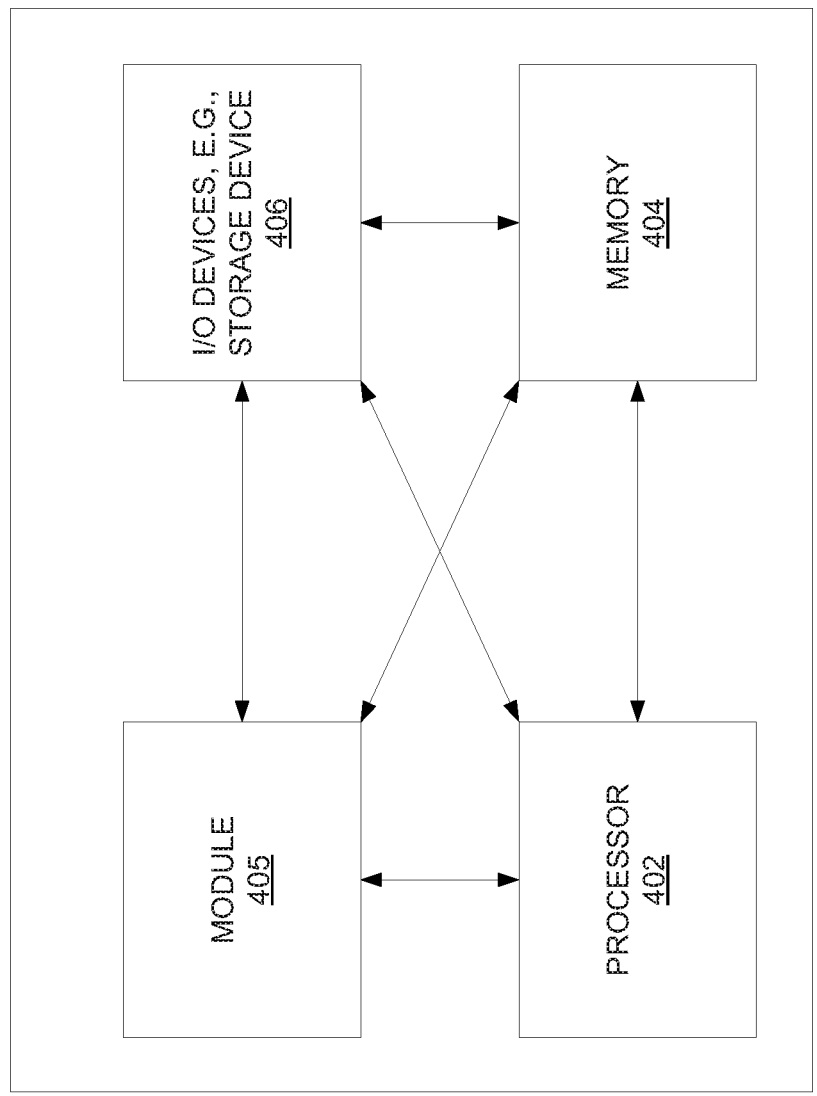

DEVICE VIRTUALIZATION SECURITY LAYER

The present disclosure relates generally to management of virtual machines, and more particularly to methods, computer-readable media, and devices for instantiating a virtual machine when a virtual machine configuration file is determined to comprise dictionary-recognizable words in accordance with a decryption using at least one code that is obtained from a virtual machine orchestrator, and to methods, computer-readable media, and devices for writing a set of data to at least a portion of available memory resources and generating an alert of possible unauthorized memory usage in response to determining a memory conflict based on the writing.

BACKGROUND

There are two primary types of computing device virtualization architectures. The first comprises a virtual machine monitor (VMM), also referred to as a hypervisor, which is installed at a logical layer directly on top of the device hardware. The hypervisor accesses the device hardware via a designated hardware interface, such as Industry Standard Architecture (ISA) hardware interface. The hypervisor presents a virtual hardware interface to one or more guest operating systems, or containers. From the perspective of the guest operating systems or containers, it appears as if the interactions are directly with the device hardware via the hardware interface. The guest operating systems or containers may be unaware that the device hardware has been virtualized, and possibly shared among several guest operating systems and/or containers.

The second type of device virtualization architecture involves the hypervisor, or VMM, installed at a logical layer between a host operating system and one or more guest operating systems, or containers. The hypervisor accesses device hardware through privileged calls via the host operating system. Similar to the first type of virtualization architecture, the hypervisor in the second type of device virtualization also presents a virtual hardware interface to the guest operating system(s) and/or container(s).

SUMMARY

In one example, the present disclosure describes a method, computer-readable medium, and device for instantiating a virtual machine when a virtual machine configuration file is determined to comprise dictionary-recognizable words in accordance with a decryption using at least one code that is obtained from a virtual machine orchestrator. For example, a processing system of a device having at least one processor may obtain a set of codes from a virtual machine orchestrator, where the set of codes is obtained via a virtualization security controller of the processing system, obtain a first virtual machine configuration file from the virtual machine orchestrator, where the first virtual machine configuration file is obtained via a hypervisor of the processing system, and pass at least one code of the set of codes from the virtualization security controller to the hypervisor. The processing system may then apply via the hypervisor, a decryption to the first virtual machine configuration file using the at least one code, determine that a threshold percentage of content of the first virtual machine configuration file comprises dictionary-recognizable words in accordance with the decryption, and instantiate, via the hypervisor, a first virtual machine in accordance with the first virtual machine configuration file when it is determined that the threshold percentage of the content of the first virtual machine configuration file comprises dictionary-recognizable words.

In addition, in one example, the present disclosure describes a method, computer-readable medium, and device for writing a set of data to at least a portion of available memory resources and generating an alert of possible unauthorized memory usage in response to determining a memory conflict based on the writing. For example, a processing system of a device having at least one processor may obtain an indication of available memory resources of the device, where the indication of available memory resources is obtained via a virtualization security controller of the processing system from a hypervisor of the processing system, write via the virtualization security controller a set of data to at least a portion of the available memory resources of the device, determine via the virtualization security controller that a memory conflict exists in response to the writing, and generate via the virtualization security controller an alert of a possible unauthorized memory usage in response to determining the memory conflict.

BRIEF DESCRIPTION OF THE DRAWINGS

The teachings of the present disclosure can be readily understood by considering the following detailed description in conjunction with the accompanying drawings, in which:

FIG. 3 illustrates a flowchart of an example method for writing a set of data to at least a portion of available memory resources and generating an alert of possible unauthorized memory usage in response to determining a memory conflict based on the writing; and FIG. 4 illustrates a high level block diagram of a computing device specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
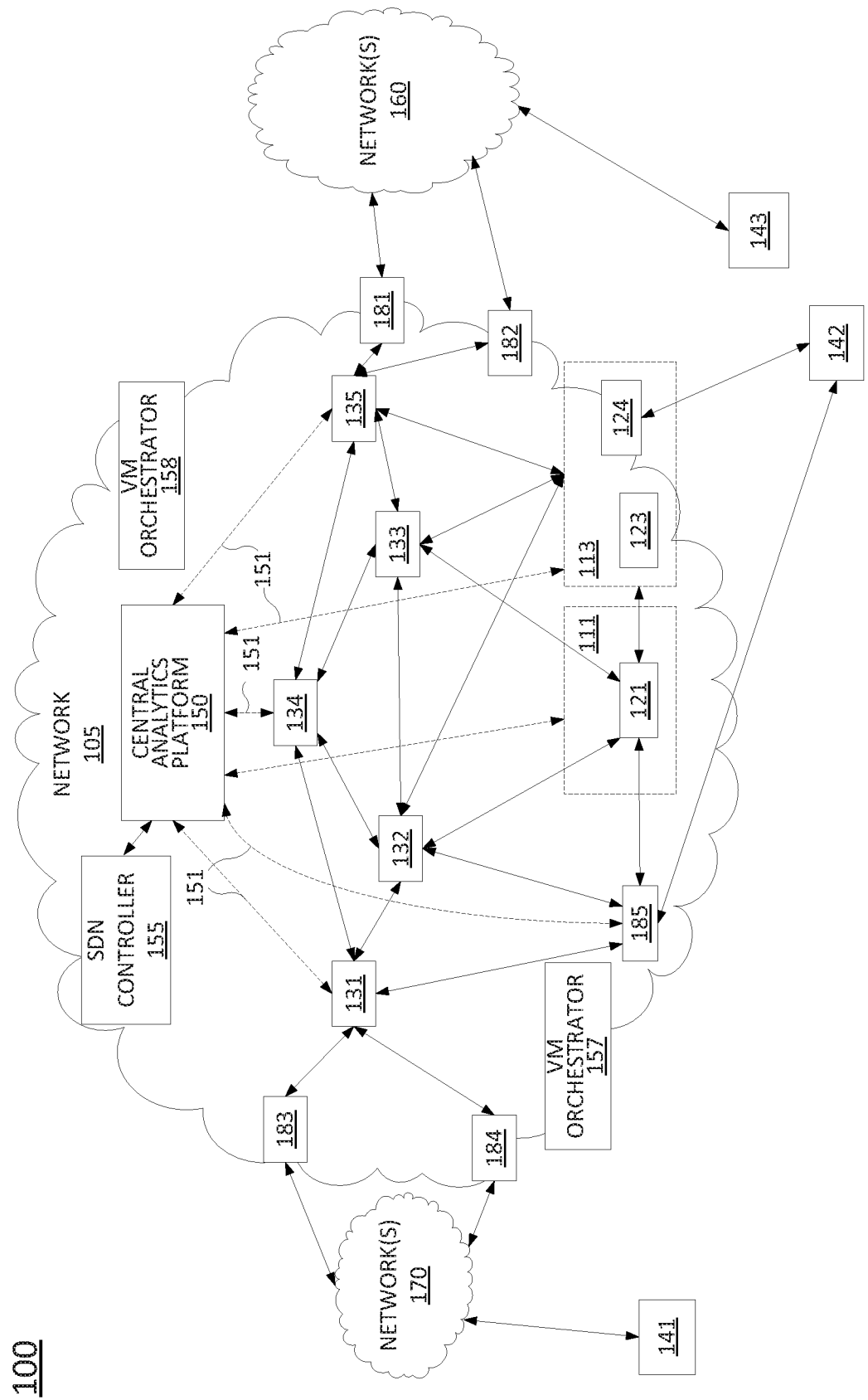
FIG. 1 illustrates an example network related to the present disclosure.

A first type of computing device virtualization architecture may comprise a virtual machine monitor (VMM), also referred to as a hypervisor, installed at a logical layer directly on top of the device hardware. The hypervisor may virtualize the hardware of the device by presenting virtual hardware interfaces to one or more guest operating systems or containers (which may both be referred to as "guests" or "virtual machines" (VMs) throughout the present disclosure). A second computing device virtualization architecture may comprise a hypervisor, installed at a logical layer directly on top of a host operating system (OS), where the host OS interfaces directly with the device hardware via designated hardware interfaces, such as ISA hardware interfaces. The hypervisor may virtualize the hardware of the device by presenting virtual hardware interfaces to one or more VMs. In other words, the hypervisor provides the appearance of the hardware interface(s) of the underlying hardware to the VMs. The actual access by the VMs to the hardware is accomplished by the hypervisor passing calls through the host OS.

In either case, virtualization of device hardware may present additional security risks. For instance, a bad actor or remote device may, without authorization, virtualize hardware elements to create malicious VMs that may be used to steal data, to cause problems with operations of the device that is virtualized or with other devices or components of a network, and so on. In addition, such a bad actor or remote device may virtualize a device or system that is not intended to be virtualized to create a malicious VM, such as the hardware for autonomous vehicles or assisted-operation vehicles, hardware for premises intrusion detection systems, cloud infrastructure manager hardware, and so forth. In many instances, the problem may be more pronounced for cloud computing platforms and other hardware elements built to be virtualized. For instance, there may be little or no control over which sectors can and cannot be virtualized. Another issue is that a legitimate VM may be installed on a hardware platform, but the VM may be infected with malicious code that may attempt to manipulate the hardware and computational resources (e.g., other software components, a host OS, other VMs, etc.) in a manner that is not originally intended and which may involve unauthorized and/or illegal activities, such as unauthorized crypto-mining, botnet activities (e.g., denial-of-service (DoS) attacks), spam dissemination, and so on.

In one example, the present disclosure comprises a virtualization security controller. In one example, the virtualization security controller may comprise a microservice controller (MC), which is a software instance with a user interface, and which may be responsible for coordinating among a plurality of microservices which collectively may provide an application that comprises the virtualization security controller. In accordance with the present disclosure, there may be two configurable versions of a virtualization security controller. The first version may comprise a package that includes a skinny OS that can interface with hardware elements (e.g., processor(s), memory, storage, network interface card(s) (NIC(s)), etc.) and it is suitable for the first type of virtualization environment. The second version may comprise a package that can be installed on top of an existing host OS and that communicates with hardware elements via the host OS (suitable for the second type of virtualization environment).

In one example, a virtualization security controller instance can reside on a separate centralized machine (virtual or physical) that is connected to other servers for permissions and monitoring. This type of arrangement may be applicable to large scale cloud environments/platforms. In another example, a virtualization security controller may be installed locally on a single hardware server in a cloud environment or platform. Similarly, a virtualization security controller may be installed on a standalone server or other computing device, such as a personal computer, a laptop computer, a cellular-based mobile computing device, and so forth. In one example, a virtualization security controller instance may hold an inventory of all virtualizable elements of a hardware device, such as processor sectors (e.g., central processing unit (CPU) sectors and/or graphics processing unit (GPU) sectors), memory sectors, storage partitions, NICs, and so forth. Via a user interface, system administrators can specify which hardware sectors/resources can be virtualized and which ones cannot. It is also possible to designate that none of the device or system is allowed to be virtualized.

In one example, the virtualization security controller may periodically scan the system for VM packages (e.g., foreign operating systems, containers, or the like) and/or VMM/hypervisor packages. In one example, the virtualization security controller may include a machine learning (ML) module that may periodically query one or more repositories that are accessible via one or more networks and/or the Internet in general for new VM and/or VMM packages to detect installation on a monitored device or system.

In one example, upon detecting the presence of an unauthorized hypervisor running on a device, the virtualization security controller may alert a system administrator or other user. Similarly, the virtualization security controller may monitor for the presence of VMs, e.g., foreign OSs (guest OSs), containers, or other "guests." In one example, virtualization security controller instances on connected platforms (e.g., connected servers) can communicate with each other to share experiences. Also, in one particular configuration/topology, local instances of virtualization security controllers can communicate with a main instance on a separate machine.

In accordance with the present disclosure, a virtualization security controller monitors the connections between VMs and hardware virtualizable elements to ensure permissions are followed for used and non-used sectors. Periodically, and/or automatically based on usage patterns, a virtualization security controller may probe the virtualizable hardware elements to see which OS commands/computations are being executed (to check if the sectors are permitted to be virtualized or not), and to see which OS (e.g., a host OS, or a guest OS, container, or other VM) initiated the operations.

In one example, a virtualization security controller may be installed and operating on a protected device in a software defined network (SDN). In such an example, the virtualization security controller may be in communication with one or more VM orchestrators. The VM orchestrators may be aware of the authorized/legitimate VMs that are spun up on the system, including required memory allocations (included in the VM configuration files) from the hardware platform. It should be noted that the VM orchestrators may also have a view of the authorized/legitimate VMMs that may be deployed and in operation on various hardware devices/hosts within the SDN. Periodically, upon request, or in accordance with another schedule, the VM orchestrator(s) may provide information regarding legitimate VMs and VMMs to the virtualization security controller. In addition, the virtualization security controller may learn and correlate authorized applications (besides the virtualized ones) running on the system and the associated memory usages. Accordingly, at any given time, the virtualization security controller can estimate the approximate memory usage and then check the hardware platform to measure actual usage.

In a network where there are multiple VM orchestrators for different regions or network segments, each virtualization security controller, which resides locally on servers or hardware platform segments, may receive one or more data feeds from all or at least a portion of the VM orchestrators in the network. Accordingly, each local virtualization security controller may be aware of the whole network topology (e.g., Internet Protocol (IP) addresses, Media Access Control (MAC) addresses, routes, etc.). Thus, each virtualization security controller may use this information to monitor the local NIC(s) to ensure the traffic between the VMs in different regions/segments of the network are routed to authorized and legitimately spun up VMs.

In one example, the virtualization security controller can confirm memory level usage by attempting to write small files and erase them on the supposedly available memory. If the memory is falsely reported to be available and it is not available (a potential sign of an unauthorized VM), writing (and in some cases reading) into the reportedly available memory will fail. In this case, the virtualization security controller may generate an alert. In addition, the virtualization security controller may perform deeper inspection to determine if unauthorized VMs are installed, or if a VM turned malicious after orchestration and consuming/binding more resources (e.g., more memory than is allocated to the VM and/or different portion(s) of memory than that which is allocated to the VM). In addition to the above, in one example, processor and NIC usage may also be observed in a similar manner to the memory. For example, any average usage that exceeds a threshold level of CPU usage or network communication may trigger deeper inspection and/or an alert.

In one example, there are secondary route connections between a virtualization security controller that resides locally and directly on top of the OS and/or directly on top of the hardware of a SDN platform unit/server, and the VM orchestrator(s) in a network. In addition, in one example, each VM configuration file that is sent to the hypervisor/VMM to create a VM needs an input (e.g., a decryption code) from the local virtualization security controller for the configuration file to be decoded and understood by the local hypervisor and/or host OS to create the VM. This step may ensure that only legitimate VM orchestrators can spin up valid VMs. Without the ability to provide such decryption codes, bad actors may be unable to cause malicious VMs to be instantiated.

These and other aspects of the present disclosure are described in greater detail below in connection with the examples of FIGS. 1-4.

To aid in understanding the present disclosure, FIG. 1 illustrates one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from devices 141-143. For instance, the traffic may relate to communications such as voice telephone calls, video and other multimedia, text messaging, emails, and so forth among the devices 141-143, or between the devices 141-143 and other devices that may be accessible via networks 160 and 170. Devices 141-143 may comprise, for example, cellular telephones, smart phones, personal computers, other wireless and wired computing devices, private branch exchanges, customer edge (CE) routers, media terminal adapters, cable boxes, home gateways and/or routers, enterprise servers, and so forth.

In accordance with the present disclosure, devices 141-143 may access network 105 in various ways. For example, device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, device 142 may comprise a customer edge (CE) router which may provide access to network 105 for additional devices (not shown) which may be connected to the CE router. For instance, in such an example, component 185 may comprise a provider edge (PE) router.

In accordance with the present disclosure, any one or more of devices 141-143 may comprise hardware resources which are capable of being virtualized and/or permitted to be virtualized. In other words, devices 141-143 may comprise "host devices" or "hosts" for one or more VMs, e.g., guest operating systems, containers, or the like. For instance, device 141 may be configured with a first type of hardware resource virtualization, e.g., a hypervisor installed at a logical layer between the hardware resources and one or more virtual machines (VMs), In addition, device 142 may be configured with a second type of hardware resource virtualization, e.g., a hypervisor installed at a logical layer between a host operating system and one or more VMs. On the other hand, device 143 may comprise a device that while capable of being configured to provide hardware virtualization, is not permitted to be so configured. For instance, an owner, user, and/or administrator of device 143 may choose to not allow the virtualization of the underlying hardware resources of the device 143. Thus, it is expected that device 143 should not have a hypervisor/VMM or any VM installed and/or in operation thereon.

Figure 2:
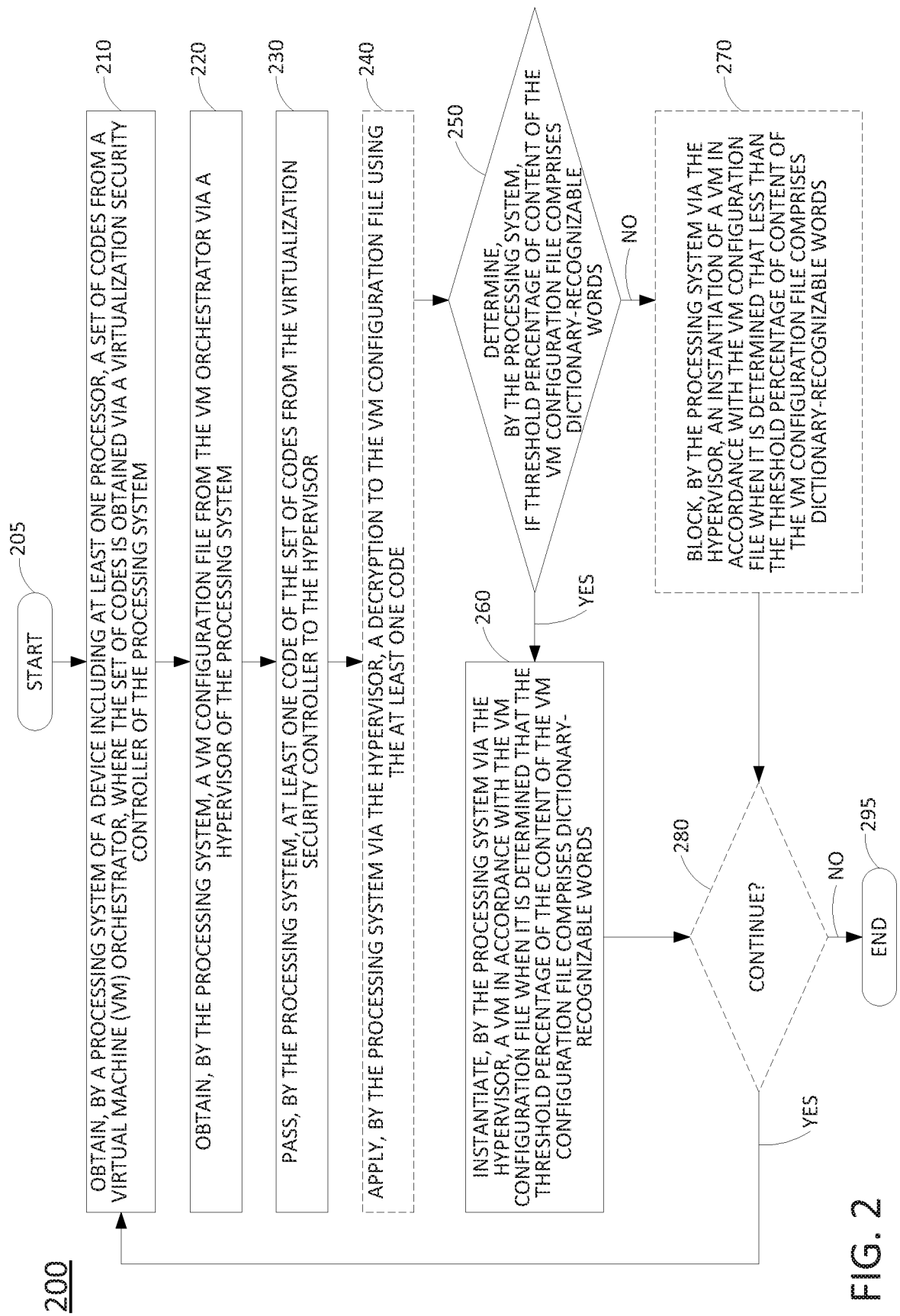
FIG. 2 illustrates a flowchart of an example method for instantiating a virtual machine when a virtual machine configuration file is determined to comprise dictionary-recognizable words in accordance with a decryption using at least one code that is obtained from a virtual machine orchestrator.

In this regard, devices 141-143 may each comprise a computing system or server, such as computing system 400 depicted in FIG. 4, and may be configured to provide one or more operations or functions for instantiating a virtual machine when a virtual machine configuration file is determined to comprise dictionary-recognizable words in accordance with a decryption using at least one code that is obtained from a virtual machine orchestrator and/or for writing a set of data to at least a portion of available memory resources and generating an alert of possible unauthorized memory usage in response to determining a memory conflict based on the writing. For instance, an example method 200 for instantiating a virtual machine when a virtual machine configuration file is determined to comprise dictionary-recognizable words in accordance with a decryption using at least one code that is obtained from a virtual machine orchestrator is illustrated in FIG. 2 and discussed in greater detail below. In addition, an example method 300 for writing a set of data to at least a portion of available memory resources and generating an alert of possible unauthorized memory usage in response to determining a memory conflict based on the writing is illustrated in FIG. 3 and discussed in greater detail below.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

To illustrate, devices 141-143 may each have installed thereon a virtualization security controller, as described herein. In one example, any one of the devices 141-143 may, via the virtualization security controller operating thereon: obtain from a hypervisor of the device an indication of available memory resources of the device, write a set of data to at least a portion of the available memory resources of the device, determine a memory conflict in response to the writing, generate an alert of possible unauthorized memory usage in response to determining the memory conflict, and so on (e.g., in accordance with the example method 300 of FIG. 3 and/or as described elsewhere herein).

Alternatively, or in addition, any one of the devices 141-143 may, via the virtualization security controller operating thereon: obtain a set of codes from a VM orchestrator (e.g., one of VM orchestrators 157 or 158), obtain via a hypervisor of the device a first VM configuration file from the VM orchestrator, pass at least one code of the set of codes from the virtualization security controller to the hypervisor, apply via the hypervisor a decryption to the first VM configuration file using the at least one code, determine that a threshold percentage of content of the first VM configuration file comprises dictionary-recognizable words in accordance with the decryption, instantiate, via the hypervisor, a first VM in accordance with the first VM configuration file when it is determined that the threshold percentage of the content of the first VM configuration file comprises dictionary-recognizable words, and so forth (e.g., in accordance with the example method 200 of FIG. 2 and/or as described elsewhere herein).

As illustrated in FIG. 1, the network 105 may also include virtual machine (VM) orchestrators 157 and 158. The VM orchestrators 157 and 158 may each comprise a computing system or server, such as computing system 400 depicted in FIG. 4, and may be configured to provide one or more operations or functions in connection with examples of the present disclosure for instantiating a virtual machine when a virtual machine configuration file is determined to comprise dictionary-recognizable words in accordance with a decryption using at least one code that is obtained from a virtual machine orchestrator and/or for writing a set of data to at least a portion of available memory resources and generating an alert of possible unauthorized memory usage in response to determining a memory conflict based on the writing.

For instance, in one example, devices 141-143 may each be controlled or managed by VM orchestrator 157, VM orchestrator 158, or both. For example, VM orchestrators 157 and 158 may be assigned to manage different virtualizable hardware resources, e.g., in different portions of the system 100, which may include different geographic or logical regions of the system 100, different routing domains, and so forth. For instance, in one example, VM orchestrators 157 and 158 may be responsible for such functions as provisioning and releasing instantiations of VMs to perform various functions.

To illustrate, VM orchestrator 157 or 158 may provide a VM configuration file to one of devices 141 or 142, or may instruct one of devices 141 or 142 to obtain a VM configuration file from another device in network 105. VM orchestrator 157 or 158 may also provide one or more instructions to instantiate a VM in accordance with the VM configuration file. In addition, VM orchestrator 157 and 158 may provide a set of codes to the one of devices 141 or 142. For instance, the VM configuration file may be obtained via a hypervisor/VMM of the one of devices 141 or 142, while the codes may be obtained via the virtualization security controller over one or more secondary network connections (e.g., out-of-band communication paths with respect to one or more connections via which the VM configuration file is obtained).

The virtualization security controller may pass one or more of the codes to the hypervisor, which will attempt to decode/decrypt the VM configuration file using one or more of the codes. Upon a successful decoding (e.g., indicated by greater than a threshold percentage or quantity of the VM configuration file being detected to comprise dictionary-recognizable words, a VM may be permitted to be instantiated on the one of devices 141 or 142 in accordance with the VM configuration file. Periodically, or based upon a different scheduling criteria, the VM orchestrators 157 and 158 may change the set of codes, may select new codes, and so forth, and may provide new and/or updated codes to device 141, device 142, and other components of network 105 that may be virtualizable and that may be managed by VM orchestrators 157 and 158. It should be noted that if an attacker attempts to load a malicious/unauthorized VM configuration file that is unencrypted, the hypervisor may not simply instantiate the corresponding unauthorized VM. Rather, the hypervisor may first still apply each of the codes in a decryption process, which may result in the unencrypted, malicious/unauthorized VM configuration file being rendered indecipherable (e.g., falling below the threshold of dictionary-recognizable words, in which case, the corresponding unauthorized VM will not be permitted to be instantiated).

Alternatively, or in addition, VM orchestrators 157 and 158 may manage the hardware resource allocations of devices 141-143 and may provide information to the respective virtualization security controllers regarding the memory utilizations of various VMs (e.g., the expected memory allocations, the average memory utilization levels, actual memory sectors, blocks, or other units that are assigned or that are to be assigned to respective VMs, and so forth). The virtualization security controllers of the respective devices 141-143 may utilize such information in connection with verifying correct device memory usage (e.g., in accordance with the example method 300 of FIG. 3). VM orchestrators 157 and 158 may also provide to the respective virtualization security controllers of devices 141-143 information regarding the authorized VMs that are installed on and/or in operation on other devices in the system 100, information regarding other devices of the system 100 that devices 141-143 and/or the VMs installed on devices 141 or 142 are permitted to communicate with, and so forth. This information may further be used to verify that local VMs on a particular one of devices 141 or 142 are communicating with legitimate VMs or other components of the system 100 (e.g., and not a malicious VM that may be installed on another device).

In one example, VM orchestrators 157 and 158 may maintain communications with VMs, host devices (or non-host devices that are managed by VM orchestrators 157 and 158) (e.g., devices 141-143, and/or the hypervisors and virtualization security controllers installed thereon) via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the VM orchestrators 157 and 158 may also comprise virtual machines operating on NFVI/host device(s), or may comprise dedicated devices.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for devices 142 and 143. In one example, NFVI 113 may represent a single computing device. Accordingly, units 123 and 124 (e.g., VMs/VNFs) may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host device(s) having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

As further illustrated in FIG. 1, network 105 includes a software defined network (SDN) controller 155. In one example, the SDN controller 155 may comprise a computing system or server, such as computing system 400 depicted in FIG. 4, and may be configured to provide one or more operations or functions in connection with examples of the present disclosure for instantiating a virtual machine when a virtual machine configuration file is determined to comprise dictionary-recognizable words in accordance with a decryption using at least one code that is obtained from a virtual machine orchestrator and/or for writing a set of data to at least a portion of available memory resources and generating an alert of possible unauthorized memory usage in response to determining a memory conflict based on the writing. In this regard, it should be noted that SDN controller 155 may also be considered to comprise a VM orchestrator. In particular, the SDN controller 155 may be more specifically directed to managing particular types of VMs, e.g., VNFs in a SDN architecture of a telecommunication network. In contrast, the VM orchestrators 157 and 158 may be more generally directed to managing various VMs which are not specifically VNFs of network 105.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

The functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In accordance with the present disclosure, NFVI 111 and NFVI 113 may each comprise a computing system or server, such as computing system 400 depicted in FIG. 4, and may be configured to provide one or more operations or functions for instantiating a VM when a VM configuration file is determined to comprise dictionary-recognizable words in accordance with a decryption using at least one code that is obtained from a VM orchestrator (e.g., in accordance with the example method 200 of FIG. 2) and/or for writing a set of data to at least a portion of available memory resources and generating an alert of possible unauthorized memory usage in response to determining a memory conflict based on the writing (e.g., in accordance with the example method 300 of FIG. 3).

For instance, either or both of NFVI 111 or NFVI 113 may have installed thereon a virtualization security controller as described herein. In one example, SDN controller 155 may provide a VM configuration file (e.g., a VNF configuration file) to one of NFVI 111 or NFVI 113, or may instruct one of NFVI 111 or NFVI 113 to obtain a VM configuration file from another device in network 105. SDN controller 155 may also provide one or more instructions to instantiate a VM (e.g., a VNF) in accordance with the VM configuration file. In addition, SDN controller 155 may provide a set of codes to the one of NFVI 111 or NFVI 113. In particular, the VM configuration file may be obtained via a hypervisor/VMM of the one of NFVI 111 or NFVI 113, while the codes may be obtained via the virtualization security controller over one or more secondary network connections (e.g., out-of-band communication paths with respect to one or more connections via which the VM configuration file is obtained).

The virtualization security controller may pass one or more of the codes to the hypervisor, which will attempt to decode/decrypt the VM configuration file using one or more of the codes. Upon a successful decoding (e.g., indicated by greater than a threshold percentage or quantity of the VM configuration file being detected to comprise dictionary-recognizable words, a VM (e.g., a VNF) may be permitted to be instantiated on the one of NFVI 111 or NFVI 113 in accordance with the VM configuration file. Periodically, or based upon a different scheduling criteria, the SDN controller 155 may change the set of codes, may select new codes, and so forth. In addition, the SDN controller 155 may provide new and/or updated codes to NFVI 111, NFVI 113, and other components of network 105 that may be virtualizable and that may be managed by SDN controller 155.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with device 142. For instance, in one example, network 105 may be configured such that device 142 (e.g., a CE router) is dual-homed. In other words, device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

In this regard, it should be noted that any one or more of the components of network 105 may comprise a computing system or server, such as computing system 400 depicted in FIG. 4, and may be configured to provide one or more operations or functions for instantiating a VM when a VM configuration file is determined to comprise dictionary-recognizable words in accordance with a decryption using at least one code that is obtained from a VM orchestrator (e.g., in accordance with the example method 200 of FIG. 2) and/or for writing a set of data to at least a portion of available memory resources and generating an alert of possible unauthorized memory usage in response to determining a memory conflict based on the writing (e.g., in accordance with the example method 300 of FIG. 3). This includes components that are intended for virtualization, and those that are not. For instance, certain devices may comprise components of network 105 that a network operator does not intend for virtualization. However, by having virtualization security controllers installed on such devices, the presence of unauthorized VMs/VNFs may be detected and malicious actions may be prevented. Similarly, the presence of unauthorized hypervisors/VMMs may be detected and malicious actions may also be prevented (where such devices should not have hypervisors/VMMs installed thereon).

In one example, network 105 further includes a central analytics platform 150. The central analytics platform 150 may comprise a computing system or server, such as computing system 400 depicted in FIG. 4, and may be configured to provide one or more operations or functions in connection with examples of the present disclosure for instantiating a virtual machine when a virtual machine configuration file is determined to comprise dictionary-recognizable words in accordance with a decryption using at least one code that is obtained from a virtual machine orchestrator and/or for writing a set of data to at least a portion of available memory resources and generating an alert of possible unauthorized memory usage in response to determining a memory conflict based on the writing. For instance, central analytics platform 150 may receive and respond to alerts from NFVI 111 and 113 (e.g., via control links 151) and/or other host devices (such as devices 141-143, internal nodes 131-135, etc.) regarding detection of possible unauthorized VMs and/or unauthorized hypervisors, and/or the detection of possible unauthorized memory usage (e.g., by a malicious VM, or by another application that is operating outside of expected permissions), and so forth. For example, central analytics platform 150 may transmit notifications of alerts to one or more devices associated with network management personnel of network 105. Alternatively, or in addition, central analytics platform 150 may activate or may communicate with one or more other network systems to activate additional monitoring processes, such as applying enhanced pattern/signature detection algorithms to detect anomalies and possible malicious activity via monitoring network traffic of a suspect device (e.g., for detecting botnet activity, scanning activity directed to other devices in network 105, data exfiltration activities, such as accessing protected databases and communication with remote servers, and the like).

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, VM orchestrators 157 and 158 may be integrated into host device(s)/NFVI. In another example, SDN controller 155, central analytics platform 150, VM orchestrators 157 and 158, and/or other network elements may comprise functions that are spread across several devices that operate collectively as a SDN controller, a central analytics platform, an edge device, a VM orchestrator, etc. In still another example, VM orchestrators 157 and 158 may be deployed in system 100 in locations other than in network 105, e.g., in access networks 160 or 170, in a local area network (LAN) of an enterprise, a home, or other customer premises, and so forth. Thus, these and other modifications of the system 100 are all contemplated within the scope of the present disclosure.

FIG. 2 illustrates a flowchart of an example method 200 for instantiating a VM when a VM configuration file is determined to comprise dictionary-recognizable words in accordance with a decryption using at least one code that is obtained from a VM orchestrator, in accordance with the present disclosure. In one example, the method 200 is performed by a component of the system 100 of FIG. 1, such as by one of devices 141-143, NFVI 111 or 113, etc., and/or any one or more components thereof (e.g., a processor, or processors, performing operations stored in and loaded from a memory), or by any one or more of such devices in conjunction with one or more other devices, such as VM orchestrators 157 or 158, SDN controller 155, and so forth. In one example, the steps, functions, or operations of method 200 may be performed by a computing device or system 400, and/or processor 402 as described in connection with FIG. 4 below. For instance, the computing device or system 400 may represent any one or more components of a device or plurality of devices in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and proceeds to step 210.

At step 210, the processing system (e.g., of a host device) obtains a set of codes from a VM orchestrator, where the set of codes is obtained via a virtualization security controller of the processing system. In one example, the virtualization security controller operates in a logical layer of the device that is between a hardware layer of the host device and a hypervisor. In one example, the virtualization security controller may also be installed and operate on top of a host OS and in a layer below the hypervisor. In one example, the virtualization security controller may comprise an application composed of a plurality of microservices.

At step 220, the processing system obtains a first VM configuration file from the VM orchestrator, where the first VM configuration file is obtained via a hypervisor of the processing system. In one example, the VM orchestrator may direct the hypervisor as to where and how to obtain the first VM configuration file, e.g., by requesting and downloading the first VM configuration file from a network-based repository. In one example, the set of codes is obtained via the virtualization security controller from the VM orchestrator at step 210 over a secondary communication path that is different from a primary communication path over which the first virtual machine configuration file is received via the hypervisor from the VM orchestrator at step 220. In other words, the secondary communication path may be considered out-of-band with respect to the primary communication path. For instance, the secondary communication path may involve a network path that is different from the primary communication path, may comprise a different session (e.g., with different security keys, where the sessions are allocated to the virtualization security controller and to the hypervisor, respectively), or both. In one example, the different network paths may involve different communication modalities, e.g., a wireless connection versus a wired network connection, etc. In any case, the set of codes is obtained via the virtualization security controller, whereas the VM configuration file is received via the hypervisor.

At step 230, the processing system passes at least one code of the set of codes from the virtualization security controller to the hypervisor.

At step 240, the processing system applies, via the hypervisor, a decryption to the first VM configuration file using the at least one code.

At step 250, the processing system determines whether a threshold percentage of content of the first VM configuration file comprises dictionary-recognizable words in accordance with the decryption. In one example, the dictionary-recognizable words may be defined by a human language dictionary. For instance, a decryption may be determined to be successful if a configuration file is determined to have at least 10%, at least 15%, etc. of the content to be dictionary-recognizable (e.g., human-readable) words, such as "port," "IP address," "memory allocation," and so forth, which are words that may be typical of and that may be expected to be found in VM configuration files.

When it is determined that the first VM configuration file meets and/or exceeds the threshold percentage of dictionary-recognizable words, the method 200 may proceed to step 260. Otherwise, when it is determined that the first VM configuration file does not meet and/or exceed the threshold percentage of dictionary-recognizable words, the method 200 may proceed to optional step 270. For illustrative purposes, it may be assumed that the first VM configuration file is determined to meet or exceed the threshold percentage of dictionary-recognizable words, and the method 200 proceeds to step 260.

In one example, steps 240 and 250 may collectively include: applying a first decryption to the first VM configuration file in accordance with at least a first code of the set of codes, determining that the threshold percentage of the content of the first VM configuration file does not comprise dictionary-recognizable words in accordance with the first decryption, applying a second decryption to the first VM configuration file in accordance with at least a second code of the set of codes, and determining that the threshold percentage of the content of the first VM configuration file comprises dictionary-recognizable words in accordance with the second decryption.

For instance, at least a first code of the set of codes may be for the first VM configuration file, while at least a second code of the set of codes may be for a second VM configuration file. In one example, the processing system may not know which code is for which VM (or VM configuration file). Thus, the processing system may try at least the first code. If this code, or set of codes, does not work, the processing system may then try a second code, or set of codes, and so forth, until a code or set of codes results in a determination that the VM configuration file meets or exceeds the threshold percentage of dictionary-recognizable words, or until all codes or sets of codes have been exhausted without success. In this regard, it should be noted that in one example, step 230 may include passing multiple codes or sets of codes from the virtualization security controller to the hypervisor.

At step 260, the processing system instantiates, via the hypervisor, a first VM in accordance with the first VM configuration file when it is determined that the threshold percentage of the content of the first VM configuration file comprises dictionary-recognizable words.

Following step 260, the method 200 proceeds to step 280. At step 280, the processing system determined whether to continue. For instance, the method 200 may run on a continuous basis until a system administrator, a VM orchestrator, a SDN controller, or the like disables a virtualization security controller of the processing system that enables the method 200, until the processing system and/or the host device is shut down, restarted, and so forth. When it is determined to continue, the method 200 may return to step 210. Otherwise, the method 200 may proceed to step 295.

At step 295, the method 200 ends.

In one example, following a determination at step 280 to continue, the method 200 may return to step 210. In one example, an additional iteration of step 210 may include obtaining, via the virtualization security controller, a new set of codes from the VM orchestrator, where the new set of codes is applied via the hypervisor to a second VM configuration file to determine whether the threshold percentage of content of the second VM configuration file comprises dictionary-recognizable words (e.g., in accordance with steps 220-250).

For illustrative purposes, an additional iteration of the method 200 may include: obtaining, via the hypervisor, a second VM configuration file from the virtual machine orchestrator (at step 220), passing each code of the set of codes from the virtualization security controller to the hypervisor (e.g., at step 230), applying, via the hypervisor, a respective decryption to the second virtual machine configuration file using each code (e.g., at step 240), and determining, via the hypervisor, that less than the threshold percentage of the content of the second VM configuration file comprises dictionary-recognizable words in accordance with the respective decryption using each code (e.g., at step 250). In such an example, the method 200 may proceed to optional step 270 following a determination at step 250 that the second VM configuration file does not comprise dictionary-recognizable words in accordance with the respective decryption using each code. In other words, all of the codes may be exhausted without success. Thus, it may be determined that the second VM configuration file is not an authorized VM configuration file.

At optional step 270, the processing system may block, via the hypervisor, an instantiation of a second VM in accordance with the second VM configuration file when it is determined that less than the threshold percentage of the content of the second VM configuration file comprises dictionary-recognizable words in accordance with the respective decryption using each code. Following step 270, the method 200 may again proceed to step 280 and continue back to step 210 or proceed to step 295 where the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 for additional VM configuration files, and so on. In one example, the method 200 may also include performance of additional operations of the method 300, as discussed in greater detail below, or additional operations in accordance with the present disclosure as described elsewhere herein. Thus, these and other modifications are all contemplated within the scope of the present disclosure.

FIG. 3 illustrates a flowchart of an example method 300 for writing a set of data to at least a portion of available memory resources and generating an alert of possible unauthorized memory usage in response to determining a memory conflict based on the writing, in accordance with the present disclosure. In one example, the method 300 is performed by a component of the system 100 of FIG. 1, such as by one of devices 141-143, NFVI 111 or 113, etc., and/or any one or more components thereof (e.g., a processor, or processors, performing operations stored in and loaded from a memory), or by any one or more of such devices in conjunction with one or more other devices, such as VM orchestrators 157 or 158, SDN controller 155, and so forth. In one example, the steps, functions, or operations of method 300 may be performed by a computing device or system 400, and/or processor 402 as described in connection with FIG. 4 below. For instance, the computing device or system 400 may represent any one or more components of a device or plurality of devices in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system (e.g., of a (host) device) obtains an indication of available memory resources of the device, where the indication of available memory resources is obtained via a virtualization security controller of the processing system from a hypervisor of the processing system. In one example, the virtualization security controller operates in a logical layer of the device that is between a hardware layer of the device and the hypervisor. In one example, the virtualization security controller comprises an application composed of a plurality of microservices. In one example, the indication of available memory resources of the device includes information regarding memory allocations of one or more VMs that are installed on the device and that are managed via the hypervisor. In one example, the indication of available memory resources of the device further includes memory allocations of one or more authorized processes that are operating in accordance with a host OS of the device. For instance, the hypervisor may be installed at a layer above a host OS and may obtain information regarding running applications/processes from the host OS. Alternatively, or in addition, the virtualization security controller may obtain information on memory utilization of host OS applications/processes from the host OS, or may receive information on the overall memory sectors that are reserved for the host OS and which should not be available to guest VMs.

At step 320, the processing system writes, via the virtualization security controller, a set of data to at least a portion of the available memory resources of the device.

At step 330, the processing system determines, via the virtualization security controller, whether a memory conflict exists in response to the writing. In one example, a memory conflict may be determined by a failure of the write operation, e.g., because a malicious or rogue VM has in some way been able to reserve the memory location for itself. Alternatively, or in addition, step 330 may comprise inspecting the at least the portion of the available memory resources of the device (e.g., at some time after the writing) and detecting that the set of data is changed. For instance, if the data written to the memory location has changed, this may indicate that an unauthorized VM, or a VM acting in an unauthorized manner has written over the supposedly available memory location with its own data.

When it is determined that a memory conflict does not exist, the method 300 may proceed to step 370. Otherwise, when the memory conflict is determined in response to the writing, the method 300 may proceed to step 340.

At step 340, the processing system generates, via the virtualization security controller, an alert of possible unauthorized memory usage in response to determining the memory conflict.

Following step 340, the method 300 may proceed to optional step 350 or to step 370.

At optional step 350, the processing system may identify a VM that is operating on at least the portion of the available memory. In one example, optional step 350 may comprise identifying that the VM is an unauthorized VM that is operating on the device. In another example, optional step 350 may comprise identifying that the VM is an authorized VM that has become malicious.

At optional step 360, the processing system may terminate the VM that is identified. It should be noted that optional steps 350 and 360 can be performed via the hypervisor, the virtualization security controller, or both in coordination with each other. The identifying of optional step 350 and the terminating of optional step 360 may specifically be performed in response to the determining of the memory conflict at step 330.

At step 370, the processing system determines whether to continue. For instance, the method 300 may run on a continuous basis until a system administrator, a VM orchestrator, a SDN controller, or the like disables a virtualization security controller of the processing system that enables the method 300, until the processing system and/or the host device is shut down, restarted, and so forth. When it is determined to not continue, the method 300 may proceed to step 395.

When it is determined to continue, the method 300 may return to step 310, to step 320, and/or to step 330. For instance, in one example, the method 300 may return to step 310 to obtain new indications and/or updates of available memory resources of the device prior to performing additional operations of steps 320, 330, and so forth. In another example, the method 300 may return to step 320 to perform a new write operation to a portion of the available memory prior to performing additional operations of steps 330, and so forth. In still another example, the method 300 may return to step 330 to inspect a portion of the available memory to which data has been previously written in order to determine whether a memory conflict exists.

As mentioned above, when at step 370 it is determined to not continue, the method 300 may proceed to step 395. At step 395 the method 300 ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 as new authorized VMs are instantiated, as authorized VMs are spun-down and released, as the available memory changes, and so on. In one example, the method 300 may also include performance of additional operations of the method 200, as discussed in greater detail below, or additional operations in accordance with the present disclosure as described elsewhere herein. Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 200 or the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for instantiating a VM when a VM configuration file is determined to comprise dictionary-recognizable words in accordance with a decryption using at least one code that is obtained from a VM orchestrator and/or for writing a set of data to at least a portion of available memory resources and generating an alert of possible unauthorized memory usage in response to determining a memory conflict based on the writing, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for instantiating a VM when a VM configuration file is determined to comprise dictionary-recognizable words in accordance with a decryption using at least one code that is obtained from a VM orchestrator and/or for writing a set of data to at least a portion of available memory resources and generating an alert of possible unauthorized memory usage in response to determining a memory conflict based on the writing (e.g., a software program comprising computer-executable instructions) can be loaded into memory 404 and executed by hardware processor element 402 to implement the steps, functions or operations as discussed above in connection with the example method 200 and/or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for instantiating a VM when a VM configuration file is determined to comprise dictionary-recognizable words in accordance with a decryption using at least one code that is obtained from a VM orchestrator and/or for writing a set of data to at least a portion of available memory resources and generating an alert of possible unauthorized memory usage in response to determining a memory conflict based on the writing (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising,
obtaining, by a processing system of a device including at least one processor, a set of codes from a virtual machine orchestrator, where the set of codes is obtained via a virtualization security controller of the processing system;
obtaining, by the processing system, a first virtual machine configuration file from the virtual machine orchestrator, wherein the first virtual machine configuration file is obtained via a hypervisor of the processing system;
passing, by the processing system, at least one code of the set of codes from the virtualization security controller to the hypervisor;
applying, by the processing system via the hypervisor, a decryption to the first virtual machine configuration file using the at least one code;
determining, by the processing system, that a threshold percentage of content of the first virtual machine configuration file comprises dictionary-recognizable words in accordance with the decryption; and
instantiating, by the processing system via the hypervisor, a first virtual machine in accordance with the first virtual machine configuration file when it is determined that the threshold percentage of the content of the first virtual machine configuration file comprises dictionary-recognizable words.

2. The method of claim 1, wherein the set of codes is obtained via the virtualization security controller from the virtual machine orchestrator over a secondary communication path that is different from a primary communication path over which the first virtual machine configuration file is received via the hypervisor from the virtual machine orchestrator.

3. The method of claim 1, wherein the virtualization security controller operates in a logical layer of the device that is between a hardware layer of the host device and the hypervisor.

4. The method of claim 3, wherein the logical layer is on top of a host operating system of the device and below the hypervisor.

5. The method of claim 1, wherein the dictionary-recognizable words are defined by a human language dictionary.

6. The method of claim 1, wherein the applying and the determining together comprise:

applying a first decryption to the first virtual machine configuration file in accordance with at least a first code of the set of codes;
determining that the threshold percentage of the content of the first virtual machine configuration file does not comprise dictionary-recognizable words in accordance with the first decryption;
applying a second decryption to the first virtual machine configuration file in accordance with at least a second code of the set of codes; and
determining that the threshold percentage of the content of the first virtual machine configuration file comprises dictionary-recognizable words in accordance with the second decryption.

7. The method of claim 6, wherein at least a first code of the set of codes is for the first virtual machine configuration file, and wherein at least a second code of the set of codes is for a second virtual machine configuration file.

8. The method of claim 1, further comprising:
obtaining, via the virtualization security controller, a new set of codes from the virtual machine orchestrator.

9. The method of claim 8, wherein the new set of codes is applied via the hypervisor to a second virtual configuration file to determine whether the threshold percentage of content of the second virtual machine configuration file comprises dictionary-recognizable words.

10. The method of claim 8, further comprising:
obtaining, via the hypervisor, a second virtual machine configuration file from the virtual machine orchestrator;
passing each code of the new set of codes from the virtualization security controller to the hypervisor;
applying, via the hypervisor, a respective decryption to the second virtual machine configuration file using each code; and
determining, via the hypervisor, that less than the threshold percentage of the content of the second virtual machine configuration file comprises dictionary-recognizable words in accordance with the respective decryption using each code.

11. The method of claim 10, further comprising:
blocking, via the hypervisor, an instantiation of a second virtual machine in accordance with the second virtual machine configuration file when it is determined that less than the threshold percentage of the content of the second virtual machine configuration file comprises dictionary-recognizable words in accordance with the respective decryption using each code.

12. A non-transitory computer-readable medium storing instructions which, when executed by a processing system of a device including at least one processor, cause the processor to perform operations comprising:
obtaining a set of codes from a virtual machine orchestrator, where the set of codes is obtained via a virtualization security controller of the processing system;
obtaining a first virtual machine configuration file from the virtual machine orchestrator, wherein the first virtual machine configuration file is obtained via a hypervisor of the processing system;
passing at least one code of the set of codes from the virtualization security controller to the hypervisor;
applying via the hypervisor, a decryption to the first virtual machine configuration file using the at least one code;

determining that a threshold percentage of content of the first virtual machine configuration file comprises dictionary-recognizable words in accordance with the decryption; and instantiating, via the hypervisor, a first virtual machine in accordance with the first virtual machine configuration file when it is determined that the threshold percentage of the content of the first virtual machine configuration file comprises dictionary-recognizable words.

13. An apparatus comprising:

a processing system including at least one processor; and a non-transitory computer-readable medium storing instructions which, when executed by the processing system, cause the processing system to perform operations, the operations comprising:

obtaining a set of codes from a virtual machine orchestrator, where the set of codes is obtained via a virtualization security controller of the processing system;

obtaining a first virtual machine configuration file from the virtual machine orchestrator, wherein the first virtual machine configuration file is obtained via a hypervisor of the processing system;

passing at least one code of the set of codes from the virtualization security controller to the hypervisor;

applying via the hypervisor, a decryption to the first virtual machine configuration file using the at least one code;

determining that a threshold percentage of content of the first virtual machine configuration file comprises dictionary-recognizable words in accordance with the decryption; and instantiating, via the hypervisor, a first virtual machine in accordance with the first virtual machine configuration file when it is determined that the threshold percentage of the content of the first virtual machine configuration file comprises dictionary-recognizable words.

14. The apparatus of claim 13, wherein the set of codes is obtained via the virtualization security controller from the virtual machine orchestrator over a secondary communication path that is different from a primary communication path over which the first virtual machine configuration file is received via the hypervisor from the virtual machine orchestrator.

15. The apparatus of claim 13, wherein the virtualization security controller operates in a logical layer of the device that is between a hardware layer of the host device and the hypervisor.

16. The apparatus of claim 15, wherein the logical layer is on top of a host operating system of the device and below the hypervisor.

17. The apparatus of claim 13, wherein the dictionary-recognizable words are defined by a human language dictionary.

18. The apparatus of claim 13, wherein the applying and the determining together comprise:

applying a first decryption to the first virtual machine configuration file in accordance with at least a first code of the set of codes;

determining that the threshold percentage of the content of the first virtual machine configuration file does not comprise dictionary-recognizable words in accordance with the first decryption;

applying a second decryption to the first virtual machine configuration file in accordance with at least a second code of the set of codes; and determining that the threshold percentage of the content of the first virtual machine configuration file comprises dictionary-recognizable words in accordance with the second decryption.

19. The apparatus of claim 18, wherein at least a first code of the set of codes is for the first virtual machine configuration file, and wherein at least a second code of the set of codes is for a second virtual machine configuration file.

20. The apparatus of claim 13, wherein the operations further comprise:

obtaining, via the virtualization security controller, a new set of codes from the virtual machine orchestrator.

* * * * *